United States Patent [19]
Kresock

[11] Patent Number: 5,235,257
[45] Date of Patent: Aug. 10, 1993

[54] CRT SCAN SYSTEM DYNAMIC FOCUS CIRCUIT

[75] Inventor: John M. Kresock, Elba, N.Y.

[73] Assignee: Eastman Kodak Company, Rochester, N.Y.

[21] Appl. No.: 943,960

[22] Filed: Sep. 11, 1992

[51] Int. Cl.$^5$ .............................................. H01J 29/58
[52] U.S. Cl. ................................................... 315/382
[58] Field of Search ....................... 315/382, 382.1, 367

[56] References Cited

U.S. PATENT DOCUMENTS 4,598,234 7/1986 McKibben ............................ 315/367

Primary Examiner—Theodore M. Blum
Attorney, Agent, or Firm—Robert L. Randall

[57] ABSTRACT

A method and apparatus for generating a dynamic focus correction voltage signal for a cathode ray tube which comprises the steps of: generating horizontal and vertical scan counter signals, and inputting the counter signals to a dynamic output voltage generating means which produces an output voltage that is proportional to the distance the scan is from the center of the image on the CRT in both the vertical and the horizontal directions.

2 Claims, 6 Drawing Sheets

CRT SCAN SYSTEM DYNAMIC FOCUS CIRCUIT

BACKGROUND OF THE INVENTION

When used to generate photographic quality images, cathode ray tube scan systems traditionally have problems producing good scan linearities. As a result, the resulting photographs are distorted in that elements at the edges of the scanned images are larger than identical elements at the center of the image. It is known that such distortions are more noticeable, and thus more objectionable, in hard copy images, e.g. still photographs, than they are in moving images such as television images.

Flat face electrostatic focus cathode ray tubes are also known to require different focus voltages at different distances from the center of the tube face. It is therefore necessary to provide a dynamic focus correction voltage signal with a circuit which is less expensive than the analog integrated circuits presently used.

SUMMARY OF THE INVENTION

Accordingly, the present invention provides a less expensive dynamic focus correction circuit which precisely time references the focus correction signal to the input scan signals and the beam position on the cathode ray tube face. Thus, proper focus correction voltages are produced for each position on the cathode ray tube face.

The present invention insures that the dynamic focus output voltage is precisely time referenced to the beam position on the CRT face. This is true even with a change in scan rate. Using horizontal and vertical scan counter outputs as dynamic focus input signals enables a dynamic focus output voltage to be developed proportional to the distance from the center of the image in the horizontal as well as in the vertical direction. Even when the rate of scan is changed, the same scan counter count represents the same position on the cathode ray tube face. The dynamic focus circuit is designed with inexpensive discrete components to replace an expensive dynamic focus correcting integrated circuit.

According to one aspect of the present invention a method is provided for generating a dynamic focus correction voltage signal for a cathode ray tube which comprises the steps of: generating horizontal and vertical scan counter signals, and inputting the counter signals to a dynamic output voltage generating means which produces an output voltage that is proportional to the distance the scan is from the center of the image on the CRT in both the vertical and the horizontal directions, and applying the output voltage to the focus electrode of the cathode ray tube.

According to another aspect of the present invention, a method is provided for generating a dynamic focus correction voltage signal for a cathode ray tube comprising the steps of: generating a high frequency clock signal and passing the signal through a vertical counter and a horizontal counter to produce a vertical scan frequency signal and a horizontal scan frequency signal. Each of the counter outputs is addressed to separate circuits that shift the voltage level then amplify the absolute value of the voltage and square the voltage. The squared voltage from the separate circuits is added to produce an output voltage that is proportional to the distance the scan is from the center of the image on the CRT in both the vertical and the horizontal direction, and the output voltage is applied to the focus electrode of the cathode ray tube.

According to a further aspect of the present invention, apparatus is provided for generating a dynamic focus correction voltage signal for a cathode ray tube comprising a high frequency clock for generating a clock signal, a vertical counter, and a horizontal counter. Means is provided for passing the clock signal through the counters to produce a vertical scan frequency signal and a horizontal scan frequency signal. A pair of circuits are arranged to shift the voltage level then to amplify the absolute value of the voltage and to square the voltage. Means is provided for addressing each of the counter outputs to the separate circuits. Means is provided for adding the squared voltages from the separate circuits to produce an output voltage that is proportional to the distance the scan is from the center of the image on the CRT in both the vertical and the horizontal directions, and for applying the output voltage to the focus electrode of the cathode ray tube.

The invention will be better understood from the following more detailed description taken with the accompanying drawings and claims.

DETAILED DESCRIPTION OF A PREFERRED EMBODIMENT

Figure 1:
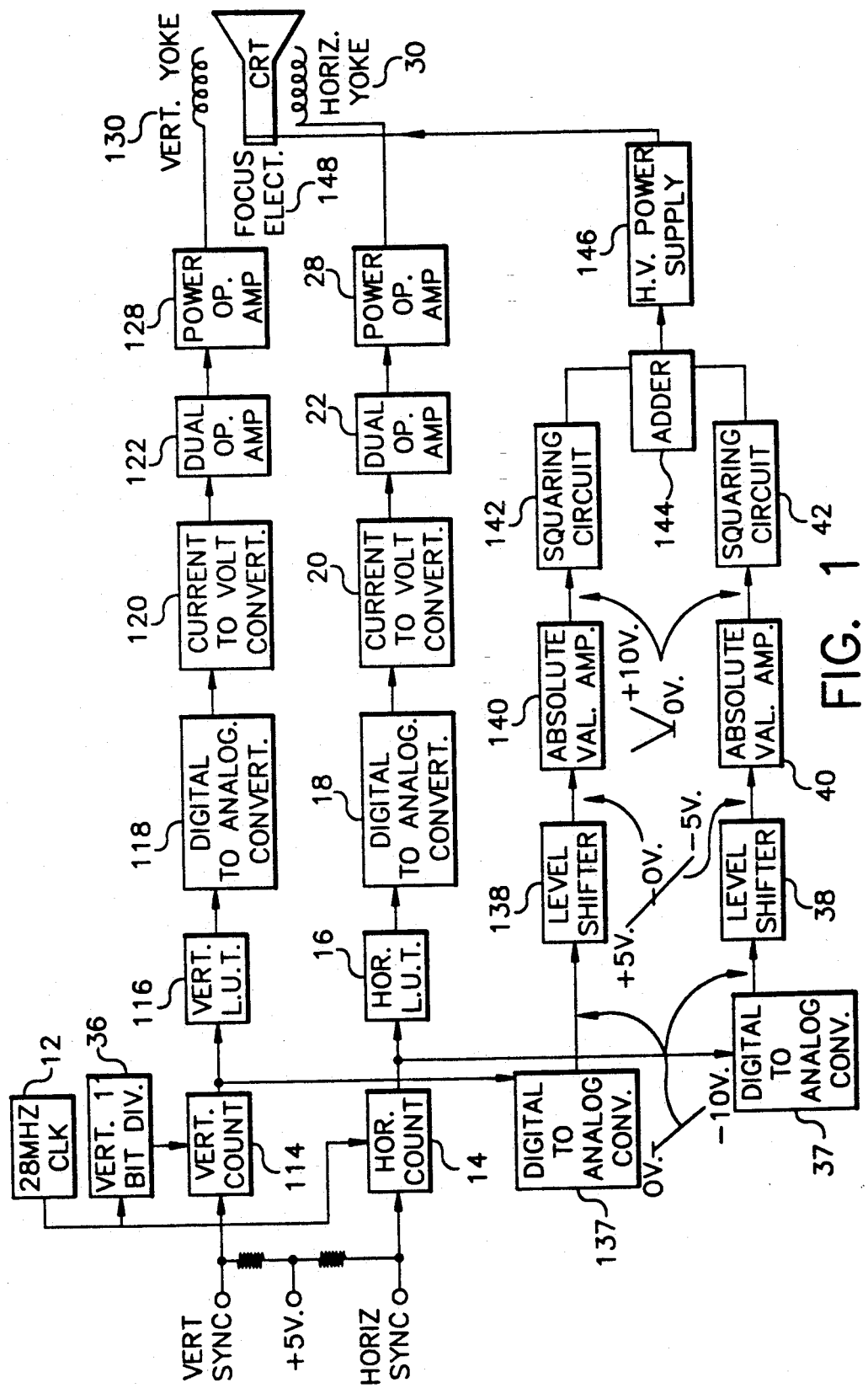
FIG. 1 is a block diagram of a scanning and focusing system for a CRT printer according to the present invention.
Figure 2A:
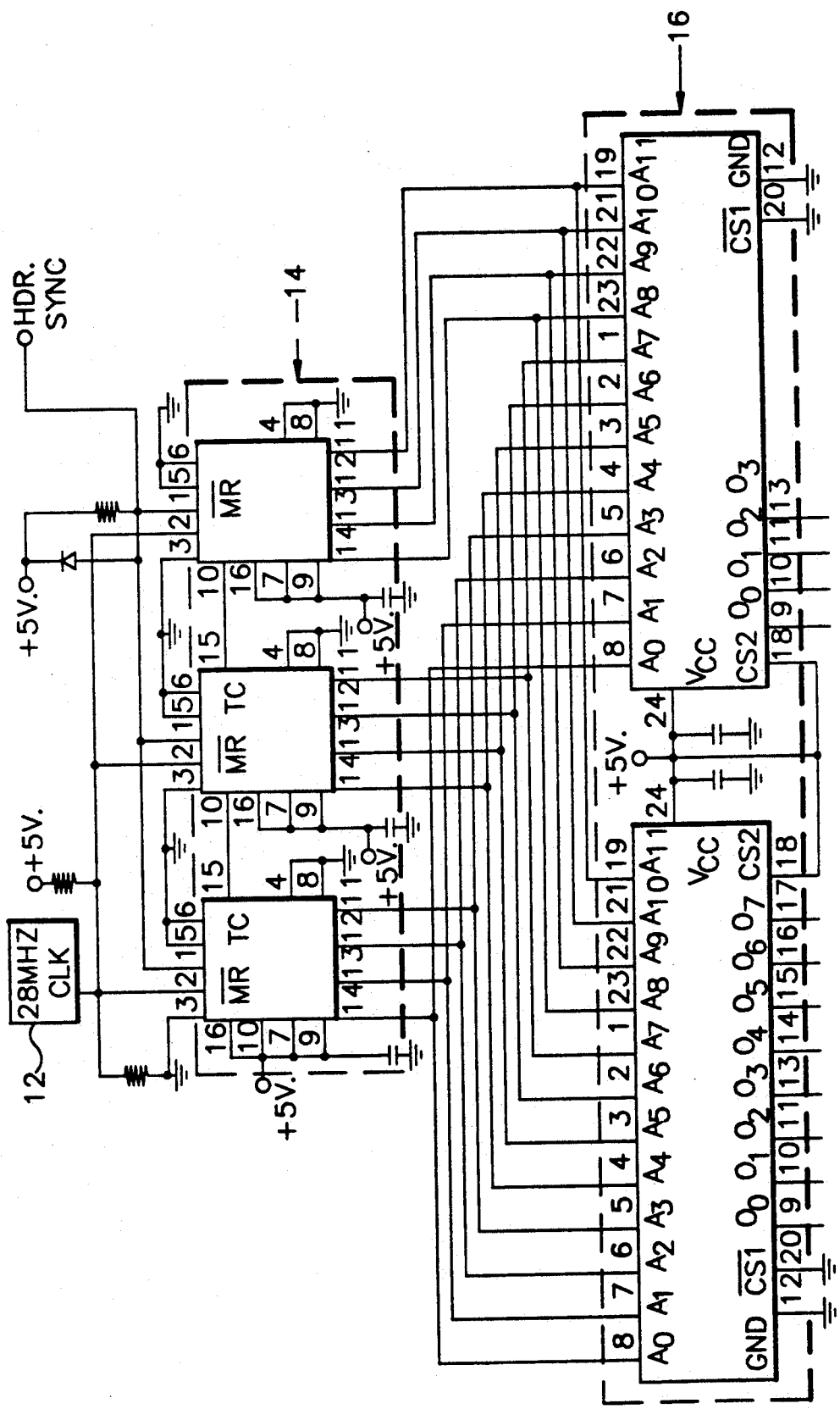
FIGS. 2A and 2B are schematic diagrams of a horizontal scanning circuit of the present invention.
Figure 2B:
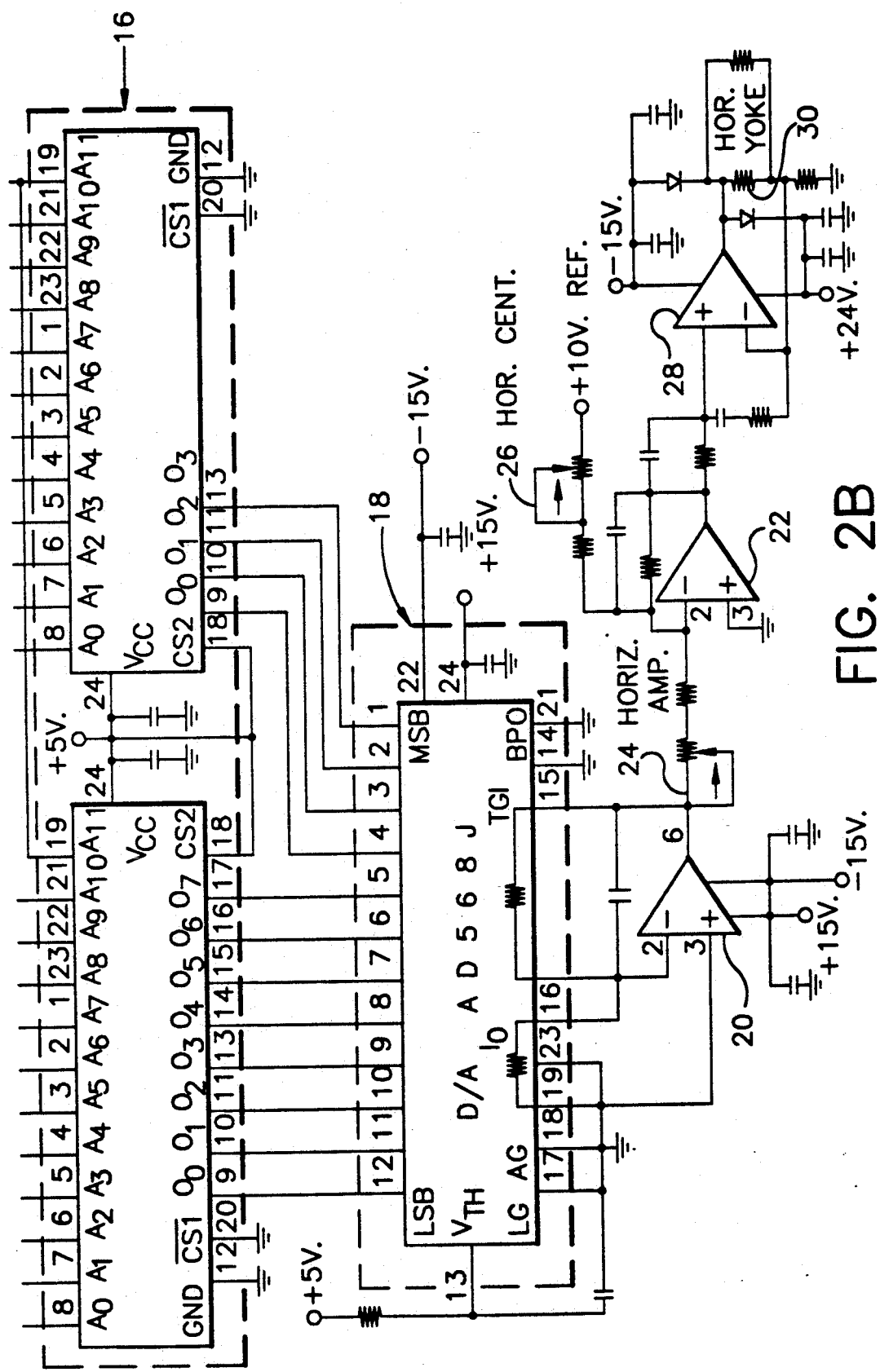

Referring to FIG. 1, a block diagram of the present invention is shown, and includes a high frequency clock 12, operating at a frequency of, for example, 28 MHZ, which outputs to a horizontal 12-bit counter 14 that counts through a 4096 count cycle and then starts over. This 12-bit counter, therefore, divides the 28 MHZ clock signal by 4096 to produce a fast scan free run cycle frequency of 6.836 KHZ. The counter 14 output addresses a horizontal lookup table 16 and clocks out a digital scan waveform stored therein The horizontal lookup table requires a size of 4096×12 addresses and can use conventional devices, examples of which are illustrated in the schematic shown in FIG. 2, each of which have a 4096×8 architecture. Therefore, two electrically programmable memory devices, or EPROMS, 16 are needed; the entire 4096×8 memory of one, and 4096×4 memory of the other. The lookup tables have 4096 time steps per scan cycle as well as 4096 different scan current levels programmed into them. Therefore, these circuits produce virtually analog horizontal deflection currents.

Figure 3:
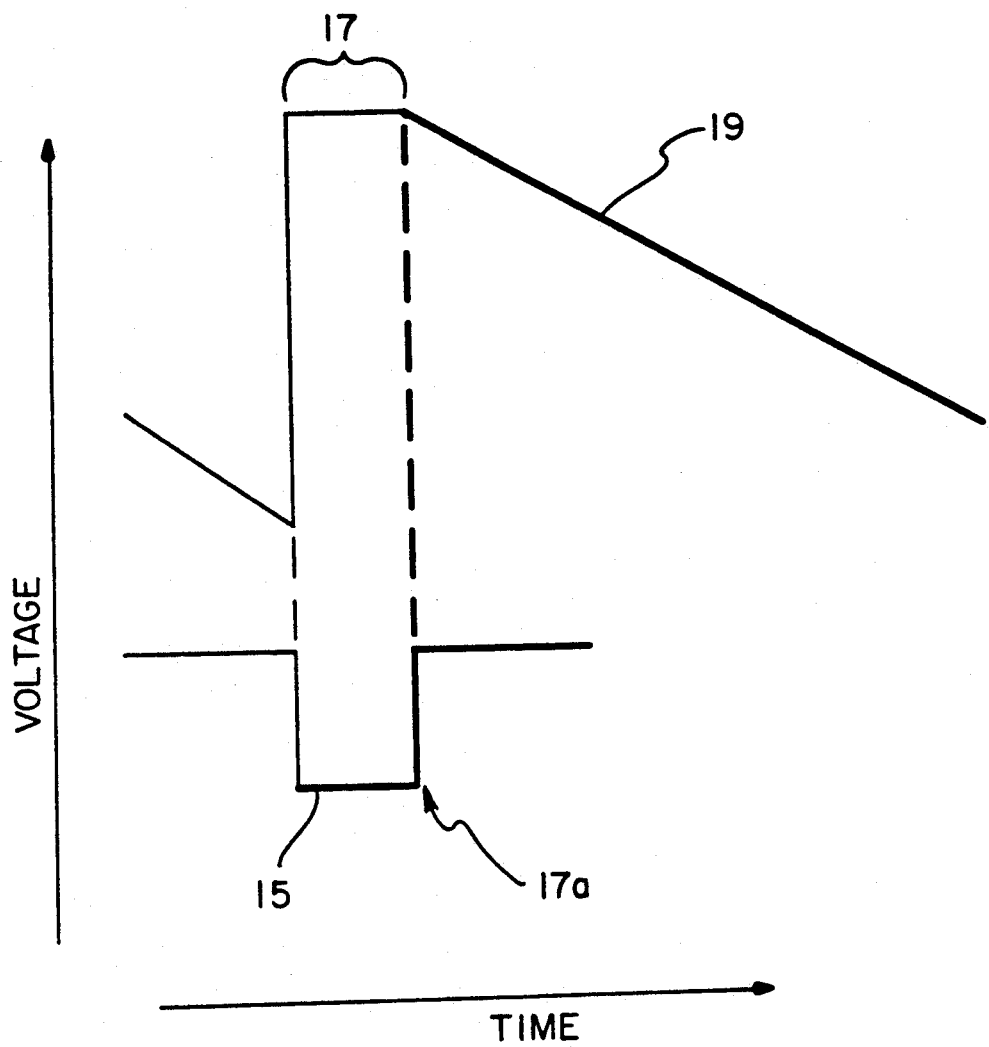
FIG. 3 is graphic illustration of the horizontal scan voltage waveform provided by the present invention.

A low (for example, zero in the specific system illustrated) horizontal sync signal is provided to the horizontal scan circuit to reset the 12-bit horizontal counter 14 before a count of 4096 is reached. As the counter is reset to a zero count the horizontal look-up-table is reset to the starting current level for a horizontal scan. The length of time that the horizontal sync signal is held low determines the time allocated for horizontal retrace. (See FIG. 3). When the horizontal sync signal goes from low to high (e.g. +5 v.) a horizontal scan begins. The output signal from the horizontal lookup table 16 goes to a digital-to-analog converter 18 ( such as an AD568J digital-to-analog converter) to be returned to the analog domain. The current output from the converter 18 is fed to a current to voltage converter 20, such as an LF411CN, which produces a voltage signal output. The voltage output is then fed to one half of a dual operational amplifier 22, such as a LF412CN, which is used in conjunction with two potentiometers, 24 and 26, to adjust both the amplitude and the DC operating point of the scan voltage waveform. The horizontal amplitude control works in such a way that the beginning edge of horizontal scan does not change with amplitude control adjustment. This feature enables noninteractive production set-up of the amplitude and centering controls. The vertical scan has this same feature. The output from this section of the LF412 is applied to the noninverting input of, for example, an LM12CLK power operational amplifier 28, which in turn drives the horizontal winding 30 of the CRT deflection yoke. The horizontal deflection yoke current is directly proportional to the voltage applied to the noninverting input of the power operational amplifier 28 except during retrace. Therefore, precise control of the horizontal scan profile can be achieved by shaping the horizontal scan waveform in the horizontal lookup table.

The high frequency clock signal components of the horizontal scan signal are suppressed by two single pole low-pass filters that each have a corner frequency of approximately 160 KHZ. This provides a 12 dB per octave roll-off in amplitude for signal components above 160 KHZ. The output amplifier 28 also rolls off signals above 100 KHZ. Because the fundamental horizontal scan frequency is 6.836 KHZ, the above-mentioned roll-offs do not significantly affect the shape of the scan waveform.

Figure 4A:
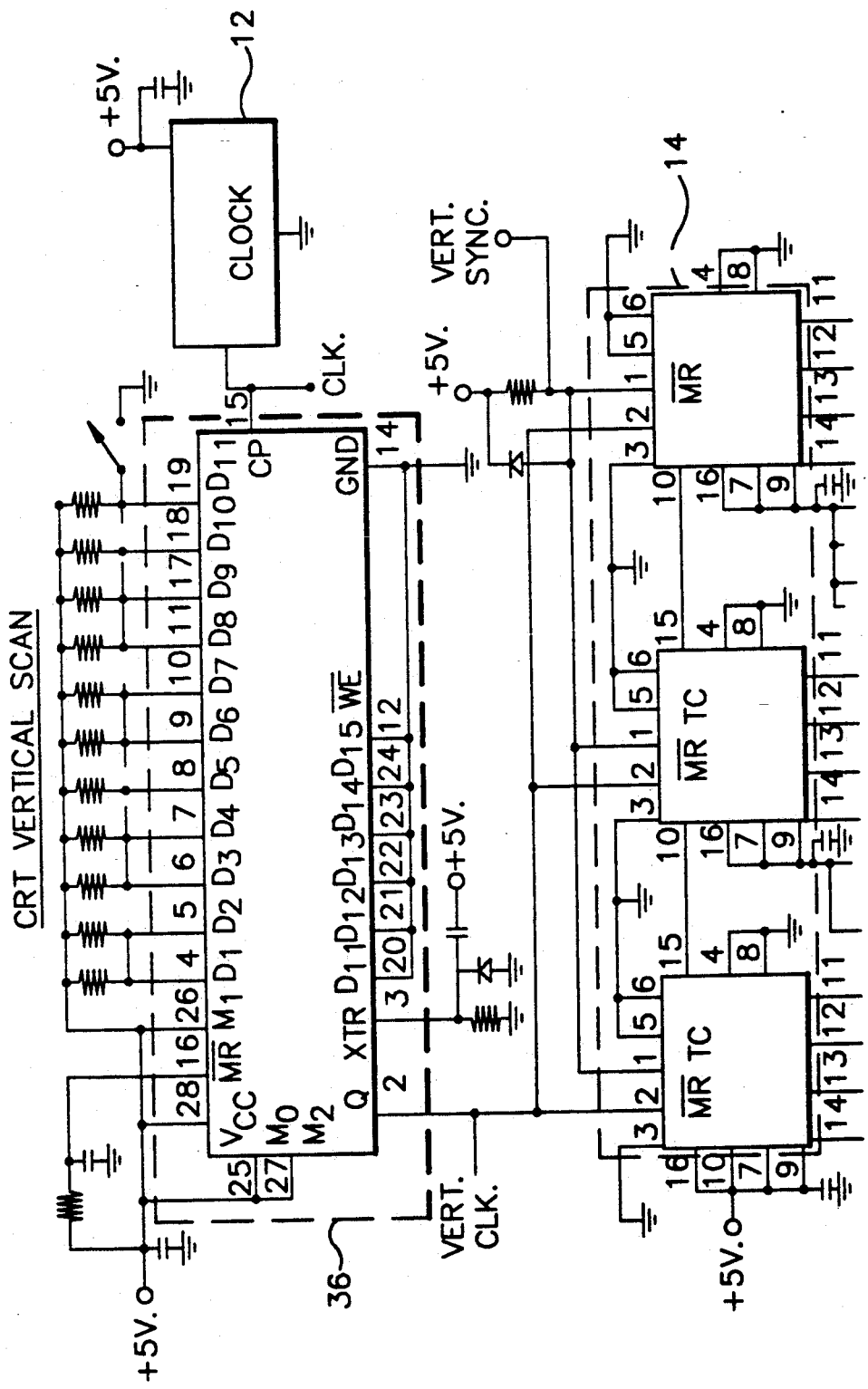
FIGS. 4A and 4B are schematic diagrams of a vertical scanning circuit of the present invention.
Figure 4B:
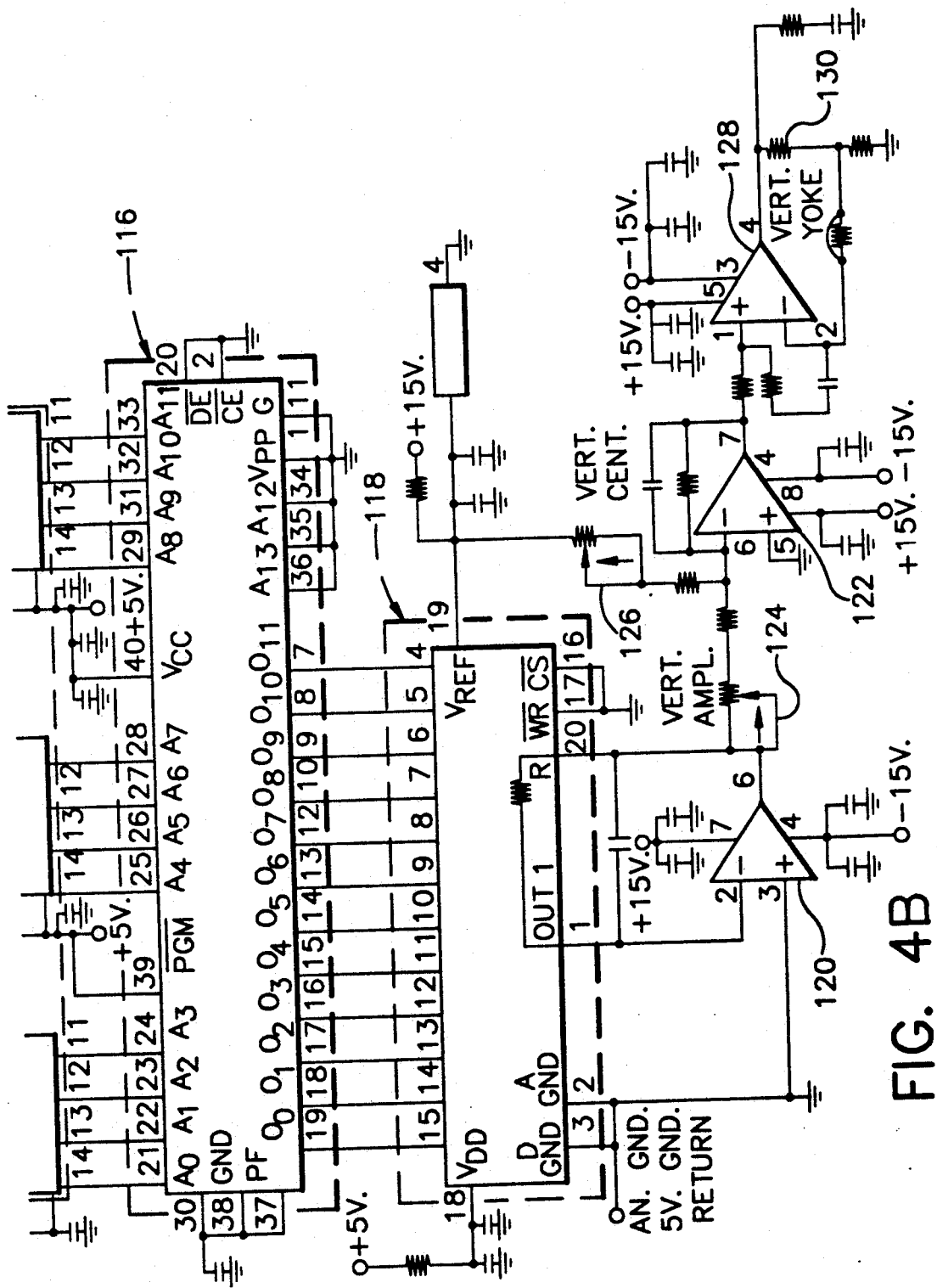

Referring now to FIG. 4 for the vertical scan, the output from the high frequency clock 12 also goes to an 11 bit divider 36 that is switch settable to divide the signal by a number which is equal to the total number of horizontal lines in a complete vertical scan cycle. In the preferred embodiment, 1024 active horizontal scan lines are employed for each vertical scan plus a period of time equal to 10 horizontal scan lines for vertical retrace. The 11 bit divider is thus set to divide the high frequency signal by 1034. This produces a slow scan vertical frequency of 6.611 HZ. The remainder of the vertical scan circuit is similar to the horizontal scan circuit and are given the same reference numbers as those used for the similar components in the horizontal scan circuit with the prefix "1". The vertical lookup table, however, is a single 16K×16, such as a 27C202 EPROM integrated circuit, and the corner frequency for the low-pass filters is approximately 1.3 kilohertz instead of 160 KHZ. Another difference between the horizontal and vertical scan circuits is that the vertical power operational amplifier 128 (LM675T) requires +15 V. and −15 V instead of the +24 V required for the horizontal output . The +24 V is needed in the horizontal scan circuit to speed up the horizontal retrace by providing more retrace voltage to reverse the yoke current more quickly.

Ideal focus voltage for the focus element of a flat face electrostatic focus cathode ray tube is different at different positions in the raster. A dynamic focus circuit is provided which interfaces with the cathode ray tube scan system described above. This focus circuit uses the horizontal and vertical scan counter outputs as input signals. These signals are taken from the outputs of the counters 14 and 114 and are passed through digital to analog converters, 37 and 137, and the outputs are delivered to level shifter circuits 38 and 138 to change the ramp voltage excursions from 0 V./−10 V. to −5 V./+5 V., with 0 V. indicating the middle of horizontal and vertical scan. The outputs of the level shifter circuits are inputted into absolute value amplifiers 40 and 140 that produce the same positive output voltage when the input signal is positive or negative an equal voltage value. The outputs of the absolute value amplifiers are fed to squaring circuits 42 and 142 that produce horizontal and vertical parabola current signals that are then summed at the current summing circuit 144. The output of the summing circuit is a parabolic horizontal and vertical voltage signal that is sent to the dynamic focus input of a dynamic focus high voltage power supply 146 that drives the focus electrode 148 of the cathode ray tube. Flat face electrostatic focus cathode ray tubes require different focus voltages at different distances from the center of the tube face.

A dynamic focus correction voltage signal is thus provided that is precisely time referenced to the beam position on the cathode ray tube face which allows the proper correction voltages to be produced at each position on the cathode ray tube face. The present dynamic focus correction circuit is significantly less expensive than the analog correction integrated circuit design previously used.

It is appreciated and understood that the specific embodiments of the invention described hereinabove are merely illustrative of the general principles of the invention. Various modifications may be made by those skilled in the art which are consistent with the principles set forth.

I claim:

1. The method of generating a dynamic focus correction voltage signal for a cathode ray tube comprising the steps of: generating a high frequency clock signal and passing said signal through a vertical counter and a horizontal counter to produce counter output signals, producing a vertical scan frequency signal and a horizontal scan frequency signal using said counter output signals, addressing each of said scan frequency signals to separate circuits that shift the voltage level then amplify the absolute value of said voltage and square said voltage, adding said squared voltages from said separate circuits to produce an output voltage that is proportional to the distance the scan is from the center of the image on the CRT in both the vertical and the horizontal direction, and applying said output voltage to the focus electrode of said cathode ray tube.

2. Apparatus for generating a dynamic focus correction voltage signal for a cathode ray tube comprising a high frequency clock for generating a clock signal, a vertical counter, a horizontal counter, means for passing said clock signal through said counters to produce a vertical scan frequency signal and a horizontal scan frequency signal, a pair of circuits arranged to shift the voltage level of said scan frequency signals then to amplify the absolute value of said voltage and to square said voltage, means for addressing each of said scan frequency signals to one of said pair of circuits, means for adding said squared voltages from said circuits to produce an output voltage that is proportional to the distance the scan is from the center of the image on the CRT in both the vertical and the horizontal directions, and means for applying said output voltage to the focus electrode of said cathode ray tube.

* * * * *